US008881016B2

(12) United States Patent
Barnes et al.

(10) Patent No.: US 8,881,016 B2
(45) Date of Patent: Nov. 4, 2014

(54) INITIAL SETUP WITH AUTO-DETECTION, CONTEXTUAL HELP AND ADVERTISEMENT SPACE

(75) Inventors: Tracy Barnes, San Diego, CA (US); Travis Baurmann, San Diego, CA (US); Steven Friedlander, San Diego, CA (US); Seth Hill, La Mesa, CA (US); Yuko Nishikawa, La Jolla, CA (US); Sabrina Yeh, Laguna Beach, CA (US); Hyehoon Yi, Escondido, CA (US)

(73) Assignee: Sony Corporation, Tokyo (JP)

( * ) Notice: Subject to any disclaimer, the term of this patent is extended or adjusted under 35 U.S.C. 154(b) by 296 days.

(21) Appl. No.: 12/905,948

(22) Filed: Oct. 15, 2010

(65) Prior Publication Data
US 2012/0096363 A1 Apr. 19, 2012

(51) Int. Cl.
G06F 15/177 (2006.01)
H04N 21/4363 (2011.01)
H04N 21/431 (2011.01)
H04N 21/442 (2011.01)
G06Q 30/02 (2012.01)
H04N 5/445 (2011.01)
H04N 21/485 (2011.01)
H04N 21/81 (2011.01)

(52) U.S. Cl.
CPC ............ H04N 5/445 (2013.01); H04N 21/4363 (2013.01); H04N 21/4312 (2013.01); H04N 21/44227 (2013.01); G06Q 30/0262 (2013.01); H04N 21/485 (2013.01); H04N 21/812 (2013.01); H04N 21/4316 (2013.01)
USPC ........................................................ 715/736

(58) Field of Classification Search
USPC ........................................ 715/736; 705/14.59
See application file for complete search history.

(56) References Cited

U.S. PATENT DOCUMENTS 5,444,642 A * 8/1995 Montgomery et al. ......... 702/91
6,549,304 B1 4/2003 Dow et al.
(Continued)

FOREIGN PATENT DOCUMENTS

CN 1605199 4/2005
CN 1894958 A 1/2007
(Continued)

OTHER PUBLICATIONS

"Rename a network connection", TechNet, Microsoft Corp., Oct. 14, 2010, http://technet.microsoft.com/en-us/library/cc753952.*

(Continued)

Primary Examiner — Alvin Tan
Assistant Examiner — Joseph R Burwell
(74) Attorney, Agent, or Firm — John L. Rogitz

(57) ABSTRACT

A digital device comprises data processing unit displaying a graphic user interface (GUI) and an initial setup module. The initial setup module includes autodetection module, contextual help module, and advertisement module. The autodetection module automatically detects at least one of a network, a television cable, and a plurality of inputs connected to the digital device, and populates a connections list in a second panel including the result of the automatic detection. The contextual help module displays at least one of texts, images and animations in a first panel that help the user understand the steps of the initial setup. The advertisement module displays advertisements in the first panel when the digital device is loading. The digital device may be loading at least when the autodetection module is automatically detecting or when the contextual help module is loading the at least one of texts, images and animations to be displayed.

18 Claims, 3 Drawing Sheets

(56) References Cited

U.S. PATENT DOCUMENTS

| | | | |
|---|---|---|---|
| 6,930,730 B2 * | 8/2005 | Maxon et al. | 348/734 |
| 7,007,234 B2 * | 2/2006 | Hawkins | 715/722 |
| 7,133,162 B2 * | 11/2006 | Dow et al. | 358/473 |
| 7,916,869 B2 * | 3/2011 | Xu et al. | 380/262 |
| 2002/0166127 A1 | 11/2002 | Hamano et al. | |
| 2003/0075983 A1 * | 4/2003 | Stecyk et al. | 307/38 |
| 2004/0181818 A1 * | 9/2004 | Heyner et al. | 725/146 |
| 2004/0187168 A1 * | 9/2004 | Shintani et al. | 725/153 |
| 2005/0015644 A1 | 1/2005 | Chu et al. | |
| 2005/0154766 A1 * | 7/2005 | Huang et al. | 707/104.1 |
| 2007/0038514 A1 * | 2/2007 | Patterson et al. | 705/14 |
| 2007/0178933 A1 * | 8/2007 | Nelson | 455/550.1 |
| 2008/0046921 A1 * | 2/2008 | Fujimaki | 725/34 |
| 2008/0086745 A1 * | 4/2008 | Knudson et al. | 725/40 |
| 2009/0019485 A1 * | 1/2009 | Ellis et al. | 725/40 |
| 2009/0237573 A1 * | 9/2009 | Hornback et al. | 348/734 |
| 2009/0265214 A1 * | 10/2009 | Jobs et al. | 705/10 |
| 2009/0319375 A1 * | 12/2009 | Dharmaji | 705/14.64 |
| 2010/0107195 A1 | 4/2010 | Hsu et al. | |
| 2011/0131610 A1 * | 6/2011 | Lee et al. | 725/48 |

FOREIGN PATENT DOCUMENTS

| | | |
|---|---|---|
| JP | 2007134956 A | 5/2007 |
| KR | 1020010009607 | 2/2001 |
| KR | 1020100069252 | 6/2010 |

OTHER PUBLICATIONS

Korean Patent Application No. 10-2011-88712, Notice of Preliminary Rejection, mailed Oct. 19, 2012, (with English Translation).

Mitsubishi Electric, DLP High Definition TV Models ("http://www.hdtvsolutions.com/pdf/mog.pdf"), Owners Guide, 2009.

Sony, Quick Setup Guide ("http://www.docs.sony.com/release/KDL46VL130_gs.pdf"), 2007.

Chinese first Office Action dated Dec. 30, 2013 for application No. CN201110306053.2.

* cited by examiner

INITIAL SETUP WITH AUTO-DETECTION, CONTEXTUAL HELP AND ADVERTISEMENT SPACE

BACKGROUND

1. Field

Embodiments of the invention relate to the initial setup of a digital device. More specifically, one embodiment of the invention relates to an apparatus and method for implementing an initial setup of a digital device that includes auto-detection, contextual help using text, images and animation, and including advertisements during loading time and processing of the setup.

2. Background

In recent years, televisions offer more features and capabilities. For example, televisions may now interface with video game consoles, the Internet as well as elaborate audio systems. Given these new features, the initial setup of the television has become increasingly more complicated for the user.

For instance, upon the first activation of a television, a user may be prompted to perform simple setups such as choosing the language preferences to more complicated tasks such as identifying a home Internet network, and distinguishing the external systems that are connected to each of the external inputs of the digital device.

Current systems merely provide the user with a step-by-step guide to walk them through this initial setup of the television. This guide usually entails textual inquiries and instructions. For example, the current initial setup systems may ask the user: "do you have a network to install?" and "is this network a wired or wireless network?" A technologically savvy user may comprehend this type of question and adequately set up their home wired or wireless network to be recognized by the digital device. However, many users could benefit from further assistance to comprehend these type questions.

Additionally, during processing or loading of each of the setup options, current setup systems merely display a blank screen or an "in progress" type animation. The user remains idle during this time and is provided with no useful information.

SUMMARY

Embodiments of an apparatus and method for implementing an initial setup of a digital device are described.

According to one embodiment, an apparatus such as a digital device includes a data processing unit to display a graphic user interface (GUI). The GUI includes a first panel and a second panel. The digital device may also comprise an initial setup module coupled to the data processing unit. The initial setup module may include an autodetection module, a contextual help module, and an advertisement module. The autodetection module automatically detects at least one of a network, a television cable, and a plurality of inputs connected to the digital device. The plurality of inputs may include, for example, HDMI inputs and video components. External devices such as video game consoles, DVD players, audio systems, cable set-top boxes, satellite boxes and modems may be connected to each of the plurality of inputs, respectively. The autodetection module may also populate a connections list in the second panel which includes the result of the automatic detection. This connections list may also include selectable text.

The contextual help module displays at least one of texts, images and animations in the first panel to aid the user to understand and make a more informed decision at each step of the initial setup. For instance, when the network is detected and displayed as part of the selectable text in the second panel, the at least one of texts, images and animations displayed in the first panel describe a type of network being selected in the second panel. The type of network may include wired and wireless networks. In one embodiment, if the network includes a wired network, the contextual help module displays at least an animation illustrating an Ethernet cord being connected to the Ethernet input on the digital device. In another embodiment, when the plurality of inputs are detected and displayed as part of the selectable text in the second panel, the at least one of texts, images and animations displayed in the first panel describe the list of the plurality of detected inputs. In one embodiment, the second panel also displays editable text and selectable icons which the user may edit and choose to be associated with each of the plurality of inputs being labeled, respectively. In another embodiment, when the television cable and the network are detected and displayed as part of the selectable text in the second panel, the autodetection module may also autoprogram a local region, a current date and time to be associated with the digital device.

The advertisement module displays advertisements in the first panel when the digital device is loading. In one embodiment, the digital device is loading at least when the autodetection module is in the process of automatically detecting or when the contextual help module is in the process of loading the at least one of texts, images and animations to be displayed. The advertisement module may also display advertisements once the initial setup is completed.

According to another embodiment, a method for implementing an initial setup of a digital device that includes a screen displaying a GUI that includes a first and second panel starts by automatically detecting at least one of a network, a television cable, and a plurality of inputs connected to the digital device, wherein the first panel displays advertisements during process of automatically detecting. A connections list is then populated in the second panel which includes the result of the automatic detection. If the result of the automatic detection includes the network, the user is then guided through the detected network set up. This detected network setup starts by displaying in the second panel a plurality of types of network to be set up, and displaying in the first panel at least one of a text, image and animation describing a type of network being highlighted in the second panel. For instance, when the type of network being highlighted in the second panel is a wired network, an animation illustrating an Ethernet cord being connected to the Ethernet input on the digital device may be displayed in the first panel. In one embodiment, if the result of the automatic detection includes the plurality of inputs, the user may be guided through the setup of each of the plurality of detected inputs. This guided setup of the detected inputs may include populating a list of the plurality of detected inputs, displaying in the second panel the list of the plurality of detected inputs to be labeled, and displaying in the first panel at least one of a text, image, and animation describing the list of the plurality of detected inputs. In one embodiment, the first panel may also display advertisements when the at least one of texts, images and animations to be displayed are loaded. In another embodiment, when displaying in the second panel the list of the plurality of detected inputs to be labeled, editable text and selectable icons may also be displayed in the second panel.

The user may thus edit the text and select an icon to be associated with each of the plurality of detected inputs to be labeled, respectively.

In one embodiment, when the result of the automatic detection includes the television cable and the network, a local region, a current date and time may be autoprogrammed to be associated with the digital device. In another embodiment, when the result of the automatic detection includes the television cable but does not include the network, the user may be guided through setting up the television cable by prompting the user to input the local region, the current date and time, and autoprogramming the user's inputted local region, current date and time to be associated with the digital device.

In yet another embodiment, a computer-readable storage medium may have stored thereon instructions, which when executed by a computer, causes the computer to perform operations comprising automatically detecting at least one of a network, a television cable, and a plurality of inputs connected to the digital device and displaying advertisements during process of automatically detecting. A connections list is then populated in the second panel which includes the result of the automatic detection. As above, the user may be guided through the detected network set up, the setup of each of the plurality of detected inputs and/or the setup of the television cable. Further, as above, at least one of a text, image and animation may be displayed to provide contextual help to the user.

The above summary does not include an exhaustive list of all aspects of the present invention. It is contemplated that the invention includes all systems and methods that can be practiced from all suitable combinations of the various aspects summarized above, as well as those disclosed in the Detailed Description below and particularly pointed out in the claims filed with the application. Such combinations may have particular advantages not specifically recited in the above summary.

BRIEF DESCRIPTION OF THE DRAWINGS

Embodiments of the invention are illustrated by way of example and not by way of limitation in the figures of the accompanying drawings, in which like references indicate similar elements and in which.

DETAILED DESCRIPTION

Figure 1:
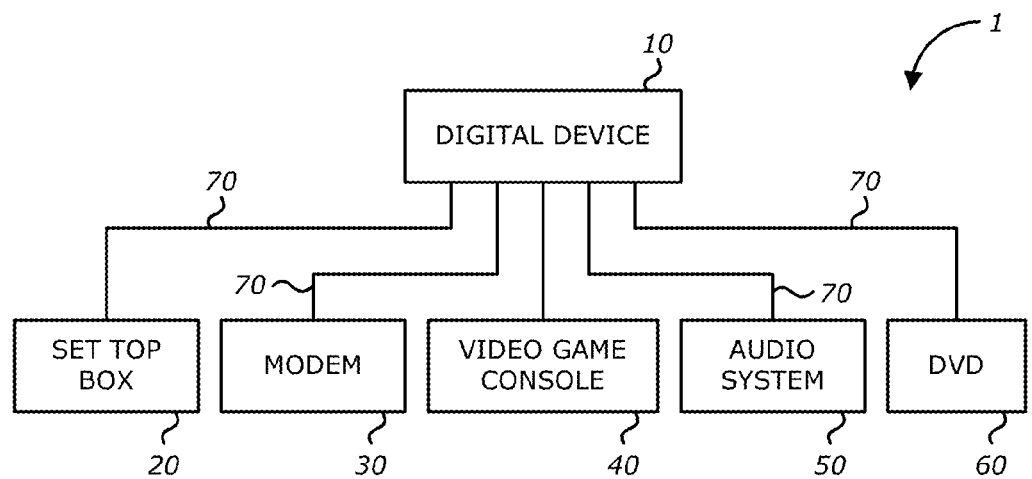
FIG. 1 is an exemplary block diagram of a system consistent with certain embodiments of the invention.

In the following description, numerous specific details are set forth. However, it is understood that embodiments of the invention may be practiced without these specific details. In other instances, well-known circuits, structures, and techniques have not been shown to avoid obscuring the understanding of this description.

For purposes of the present description, the term "digital device" may refer to a television that is adapted to tune, receive, decrypt, descramble and/or decode transmissions from any content provider. Examples of "content providers" may include a terrestrial broadcaster, a cable or satellite television distribution system, or a company providing content for download over the Internet or other Internet Protocol (IP) based networks like an Internet service provider. However, it is contemplated that the digital device may be of another form factor besides a television, such as a set-top box, a personal digital assistant (PDA), a computer, a cellular telephone, a video game console, a portable video player such as a SONY® PSP® player or an APPLE® video iPOD™, a digital video recorder, or the like.

In the following description, certain terminology is used to describe features of the invention. For example, in certain situations, the terms "component," "unit," "module," and "logic" are representative of hardware and/or software configured to perform one or more functions. For instance, examples of "hardware" include, but are not limited or restricted to an integrated circuit such as a processor (e.g., a digital signal processor, microprocessor, application specific integrated circuit, a micro-controller, etc.). Of course, the hardware may be alternatively implemented as a finite state machine or even combinatorial logic.

An example of "software" includes executable code in the form of an application, an applet, a routine or even a series of instructions. The software may be stored in any type of machine readable medium such as a programmable electronic circuit, a semiconductor memory device such as volatile memory (e.g., random access memory, etc.) and/or non-volatile memory (e.g., any type of read-only memory "ROM", flash memory, etc.), a floppy diskette, an optical disk (e.g., compact disk or digital video disc "DVD"), a hard drive disk, a tape, or the like.

While this invention is susceptible to embodiments of many different forms, there is shown in the drawings and will herein be described in detail specific embodiments, with the understanding that the present disclosure is to be considered as an example of the principles of the invention and not intended to limit the invention to the specific embodiments shown and described.

I. General Architecture

Referring to FIG. 1, an exemplary block diagram of a system 1 consistent with certain embodiments of the invention is shown. The system 1 comprises a digital device 10 and external devices including: a set top box 20, a modem 30, a video game console 40, an audio system 50, and a DVD player 60. The digital device 10 is coupled to each of the external devices via one or more transmission mediums 70 which operate as communication pathways. The transmission mediums 70 may include, but is not limited to electrical wires, optical fiber, cable, a wireless link established by wireless signaling circuitry, or the like.

The digital device 10 receives digital content such as television programming from the set top box 20 which may be a cable television set top box or a satellite television set top box. The modem 30 may be a cable modem which provides the digital device with access to the Internet via a wired Ethernet connection or a wireless connection.

The set top box 20, the video game console 40, the audio system 50, and the DVD player 60 may be connected to plurality of inputs on the digital device 10. The plurality of inputs may include HDMI inputs and video components inputs.

Figure 2:
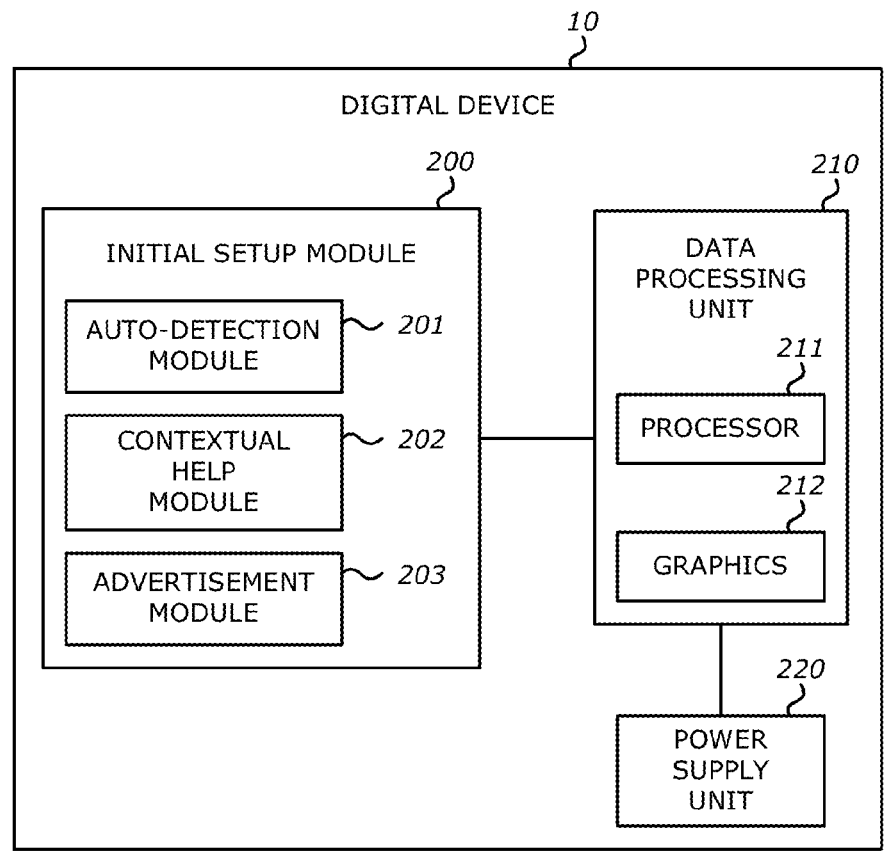
FIG. 2 is an exemplary block diagram of an initial setup module implemented within the digital device according to one embodiment of the invention.

Referring now to FIG. 2, an exemplary diagram of digital device 10 of the system 1 is shown. Digital device 10 comprises a power supply unit 220, data processing unit 210, and an initial setup module 200. These components may be implemented as separate integrated circuits or as a single integrated circuit (system-on-chip implementation) as shown.

Power supply unit 220 is adapted to provide powered to data processing unit 210. Power supply unit 220 may provide regulated power based on input power received from a power supply such as a wall socket (e.g., 110 volts alternating current "VAC", 220 VAC, etc.), or power connector within a car, or the like.

Data processing unit 210 comprises a processor 211 (e.g., central processing unit) and a graphics component 212. These components may be implemented as separate integrated circuits or as a single integrated circuit (system-on-chip implementation) as shown.

According to one embodiment, processor 211 may execute instructions received from the initial setup module 200. Graphics component 212 is adapted for rendering the on-screen graphic user interface (GUI) that guides the user through the initial setup of the digital device 10. For instance, processor 211 may be adapted to collect data from the initial setup module 200 and graphics component 212 will display the data as a GUI.

In one embodiment, the initial setup module 100 includes an auto detection module 201, a contextual help module 202 and an advertisement module 203.

The autodetection module 201 may automatically detect at least one of a network, a television cable, and a plurality of inputs connected to the digital device. Accordingly, the autodetection module 201 can determine quickly what steps in the initial setup of the digital device 10 apply to the user. For instance, a cable set top box 20 may be connected to one of the plurality of inputs such as HMDI. By automatically detecting that HMDI is connected and there is no television cable connected, the autodetection module 201 determines that the user needs to set up the HMDI input connection and does not need to set up a TV tuner. In other embodiments, the autodetection module 201 may automatically detect whether to enable the energy savings setting as well as autoprogram a local region, a current date and time to be associated with the digital device 10.

In one embodiment, the result of the automatic detection by the autodetection module 201 is used to populate a connections list to be displayed in the GUI. In one embodiment, the connections list includes text that may be selected by the user. For instance, the connections list may include the textual elements "Network," "TV," and "Inputs" and respective checkboxes in front of each text (See FIG. 3). If the autodetection module 201 automatically detects a network and a plurality of inputs connected to the digital device 10, the checkboxes in front of the elements "Network" and "Inputs" may include a checkmark. If the user selects "Network," the initial setup module will guide the user through the network connections setup. Additionally, the user may also choose to select or deselect any of the listed elements by adding or removing checkmarks from the checkboxes.

The contextual help module 202 may display at least one of texts, images and animations to help the user understand the setup steps and thus, make a more informed decision at each step of the setup. For instance, if the network is automatically detected by the autodetection unit, the type of network may be displayed as selectable text in the GUI. The type of network may include a wired or a wireless network. If the wired network is highlighted in the GUI, the contextual help module 202 may display texts, images and/or animations that describe wired network. For example, the contextual help module 202 may display an animation illustrating an Ethernet cord being connected to the Ethernet input on the digital device.

In other example, if the plurality of inputs are automatically detected and displayed on the GUI, the contextual help module 202 displays texts, images and animations that describe the list of the plurality of detected inputs. For instance, contextual help module 202 may display text stating: "the list to the right shows the connected inputs we detected." In one embodiment, when the plurality of inputs are detected and displayed as part of the selectable text, editable labels and selectable icons are displayed. The user may then associate the edited labels and selected icons with each of the plurality of inputs being labeled, respectively.

In one embodiment, the advertisement module 203 displays advertisements on the GUI when the digital device 10 is in the process of loading or working. During the digital device's loading or working time, the user is normally presented with a blank screen or an "in progress" image (e.g., a clock, a meter, or the words "in progress"). The advertisement module 203 takes advantage of the user's idle time to present advertisements that may show features of the digital device or present additional products that work in conjunction with the digital device which may be purchased. Additionally, the advertisements that are displayed in a portion of the screen thereby using less than the full picture screen so that the advertisements do not compete with the important initial setup information.

In one embodiment, the digital device 10 is in the process of loading when the autodetection module 201 is automatically detecting or when the contextual help module 202 is loading texts, images and animations to be displayed. In another embodiment, the advertisement module 203 also displays advertisements once the setup in complete.

Figure 3:
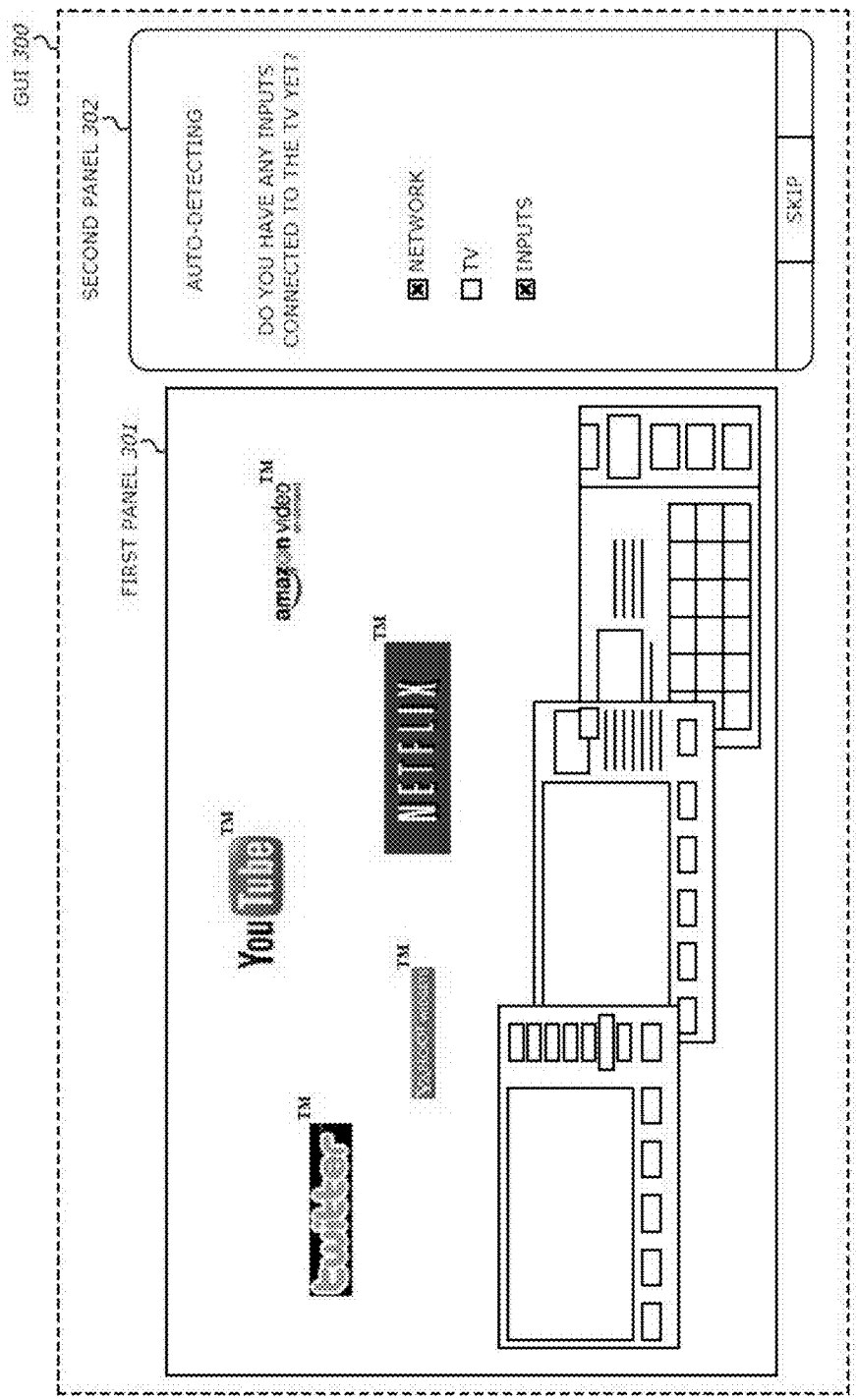
FIG. 3 is an exemplary illustration of the graphic user interface (GUI) according to one embodiment of the invention.

Referring now to FIG. 3, an exemplary illustration of the graphic user interface (GUI) as displayed by the digital device 10 is shown. The GUI 300 comprises a first panel 301 and a second panel 302. In one embodiment, the contextual help module 202 may display the texts, images and animations in the first panel 301 and autodetection module 201 displays the connections list including the results of the automatic detection in the second panel 302. In another embodiment, the advertisements being displayed by the advertisement module 203 may be included in at least a portion of the first panel 301. Accordingly, the important initial setup information as well as the selectable text are displayed in the second panel 302 and thus, are not obstructed by the advertisements and the contextual help text, images or animations which are displayed in the first panel 301.

II. Initial Setup Processes

Figure 4:
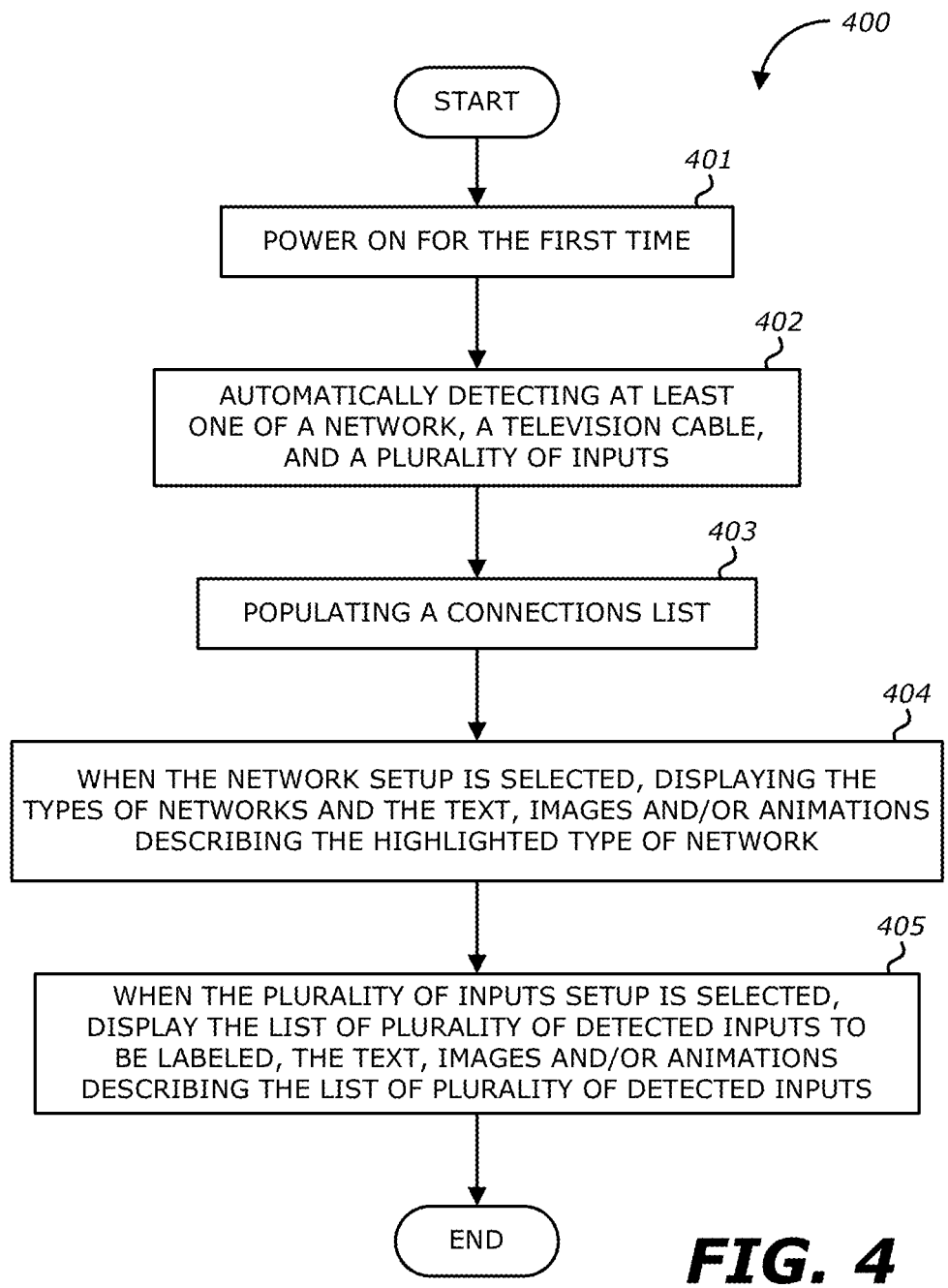
FIG. 4 is an illustrative flowchart of a method consistent with certain embodiments of the invention.

Referring now to FIG. 4, a flowchart of a method for implementing the initial setup of the digital device 10 is illustrated. Method 400 begins by powering on the digital device 10 for the first time (Block 401). At least one of a network, a television cable, and a plurality of inputs connected to the digital device 10 is then automatically detected (Block 402). In one embodiment, the first panel 301 in the GUI may display advertisements while the network, television cable and plurality of inputs are automatically detected. At Block 403, a connections list is populated using the result of the automatic detection from Block 402. For instance, if a network and a plurality of inputs have been automatically detected, the connections list may includes checkmarks in the checkboxes next to the displayed text "Network" and "Inputs" in the second panel 302. The user may further check or uncheck the checkboxes to in order to choose which features he wishes to setup. In one embodiment, if the connections list is empty, the GUI will display text, images or animations prompting the user to connect certain external devices prior to proceeding.

When the result of the automatic detection includes the network and the user selects to continue with the network setup from the second panel at Block 404, the user is guided through the detected network set up. The plurality of types of networks which may be set up are displayed in the second panel 302. The type of networks may include, for instance, wired or wireless networks. The user may select the type of network to set up from the second panel by highlighting the desired type of network. A text, image and/or animation describing the type of network being highlighted is then displayed in the first panel 301. For example, in one embodiment, if the type of network being highlighted in the second panel 302 is a wired network, the first panel 301 displays an animation illustrating an Ethernet cord being connected to the Ethernet input on the digital device 10 in order to describe to the user what a wired network entails. In one embodiment, the first panel 301 may also display advertisements when texts, images and/or animations to be displayed are loaded.

Further, when the result of the automatic detection includes the plurality of inputs and the user selects to continue with the inputs setup from the second panel at Block 405, the user is guided through setting up each of the plurality of detected inputs. A list of the plurality of detected inputs to be labeled is displayed in the second panel 302 and a text, image, and/or animation describing the list of the plurality of detected inputs is displayed in the first panel 301. In one embodiment, when the user selects one of the inputs from the list of detected inputs, editable text and selectable icons are displayed in the second panel 302 which the user may be associated with the selected input. For example, if the user selected an HMDI input that is connected to a gaming console, the user may edit the label of HDMI to read "Gaming Console" and select the icon that resembles a gaming remote control.

In one embodiment, when the television cable and the network are both automatically detected, a local region, a current date and time may be autoprogrammed. In another embodiment, when the result of the automatic detection includes the television cable but does not include the network, the user is guided through setting up the television cable by prompting the user to input the local region, the current date and time, and autoprogramming the user's inputted local region, current date and time to be associated with digital device 10.

In another embodiment, prior to automatically detecting the network, television cable, and/or plurality of inputs connected to the digital device 10 at Block 401, the method implementing the initial setup may also prompt the user to select a language preference as well as automatically detecting whether to enable energy-saving settings. In one embodiment, the user may be prompted to select the viewing environment (e.g., Home or Retail) in which the digital device is located. Based on this viewing environment, the optimal energy-saving settings are automatically detected.

In the foregoing description, the invention is described with reference to specific exemplary embodiments thereof. It will, however, be evident that various modifications and changes may be made thereto without departing from the broader spirit and scope of the present invention as set forth in the appended claims. The specification and drawings are accordingly to be regarded in an illustrative rather than in a restrictive sense.

What is claimed is:

1. A digital device comprising:
    a data processing unit displaying a graphic user interface (GUI), the GUI including a first panel and a second panel; and
    an initial setup module coupled to the data processing unit, the initial setup module including:
        (i) an autodetection module to automatically detect at least one of an Internet network, a television cable, and a plurality of inputs connected to the digital device, and to populate a connections list in the second panel including a result of the automatic detection, the connections list in the second panel including selectable text,
        (ii) a contextual help module to display at least one of texts, images and animations in the first panel, wherein
            when the Internet network is detected and the connections list that is displayed as part of the selectable text in the second panel includes a type of Internet network that is detected, the at least one of images and animations displayed in the first panel describe the type of Internet network being selected in the second panel, wherein the type of Internet network includes at least one of a wired network and a wireless network, and
            when the plurality of inputs are detected and are displayed as part of the selectable text in the second panel, the at least one of texts, images and animations displayed in the first panel describe the list of the plurality of detected inputs, and
        (iii) an advertisement module to display advertisements in the first panel when the digital device is loading, the digital device is loading at least when the autodetection module is automatically detecting or when the contextual help module is loading the at least one of texts, images and animations to be displayed.

2. The digital device of claim 1, wherein when the type of Internet network includes the wired network, the contextual help module displays in the first panel at least an animation illustrating an Ethernet cord being connected to the Ethernet input on the digital device.

3. The digital device of claim 1 wherein the plurality of inputs includes one or more HDMI inputs and one or more video component inputs.

4. The digital device of claim 1 further comprising at least one of the following being connected to the plurality of inputs, respectively: a video game console, a DVD player, an audio system, cable set-top box, a satellite box and a modem.

5. The digital device of claim 1, wherein when the television cable and the Internet network are detected and displayed as part of the selectable text in the second panel, the autodetection module to autoprogram a local region, a current date and time.

6. The digital device of claim 1, wherein when the plurality of inputs are detected and displayed as part of the selectable text in the second panel, displaying editable labels and selectable icons in the second panel to be associated with each of the plurality of inputs being labeled, respectively.

7. A method for implementing an initial setup of a digital device, the digital device including a screen displaying a graphic user interface (GUI), the GUI including a first panel and a second panel, the method comprising:
    automatically detecting at least one of an Internet network, a television cable, and a plurality of inputs connected to the digital device, wherein the first panel displays advertisements during process of automatically detecting;
    populating a connections list in the second panel including a result of the automatic detection;
    when the result of the automatic detection includes the Internet network, guiding the user through the detected Internet network set up by (i) displaying in the second panel a type of Internet network that is detected and is to be set up, wherein the type of Internet network includes at least one of a wired network and a wireless network, and (ii) displaying in the first panel at least one of an image and an animation describing the type of Internet network being highlighted in the second panel; and when the result of the automatic detection includes the plurality of inputs, guiding the user through setting up each of the plurality of detected inputs by (i) displaying in the second panel a list of the plurality of detected inputs to be labeled, and (ii) displaying in the first panel at least one of a text, image, and animation describing the list of the plurality of detected inputs.

8. The method of claim 7, further comprising:

when the result of the automatic detection includes the television cable and the Internet network, autoprogramming a local region, a current date and time; and when the result of the automatic detection includes the television cable but does not include the Internet network, guiding the user through setting up the television cable by (i) prompting the user to input the local region, the current date and time, and (ii) autoprogramming the user's inputted local region, current date and time.

9. The method of claim 7, wherein the first panel displays advertisements when the at least one of texts, images and animations to be displayed are loaded.

10. The method of claim 7, wherein when the type of Internet network being highlighted in the second panel is the wired network, displaying in the first panel at least an animation illustrating an Ethernet cord being connected to the Ethernet input on the digital device.

11. The method of claim 7, wherein the plurality of inputs includes one or more HDMI inputs and one or more video component inputs.

12. The method of claim 7, further comprising at least one of the following being connected to the plurality of inputs, respectively: a video game console, a DVD player, an audio system, cable set-top box, a satellite box and a modem.

13. The method of claim 7, wherein the displaying in the second panel the list of the plurality of detected inputs to be labeled includes displaying editable text and selectable icons to be associated with each of the plurality of detected inputs to be labeled, respectively.

14. A non-transitory computer-readable storage medium having stored thereon instructions, which when executed by a computer, causes the computer to perform operations comprising:

automatically detecting at least one of an Internet network, a television cable, and a plurality of inputs connected to a digital device, wherein the digital device includes a screen displaying a graphic user interface (GUI), the GUI including a first panel and a second panel, the first panel displays advertisements during process of automatically detecting;

populating a connections list in the second panel including a result of the automatic detection, the result of the automatic detection including at least one of the Internet network, the television cable, and the plurality of inputs;

when the result of the automatic detection includes the Internet network, guiding the user through the detected Internet network set up by (i) displaying in the second panel a type of Internet network that is detected and is to be set up, wherein the type of Internet network includes at least one of a wired network and a wireless network, and (ii) displaying in the first panel at least one of an image and an animation describing the type of Internet network being highlighted in the second panel; and when the result of the automatic detection includes the plurality of inputs, guiding the user through setting up each of the plurality of detected inputs by (i) displaying in the second panel a list of the plurality of detected inputs to be labeled, and (ii) displaying in the first panel at least one of a text, image, and animation describing the list of the plurality of detected inputs.

15. The non-transitory computer-readable storage medium of claim 14, further comprising:

when the result of the automatic detection includes the television cable and the Internet network, autoprogramming a local region, a current date and time; and when the result of the automatic detection includes the television cable but does not include the Internet network, guiding the user through setting up the television cable by (i) prompting the user to input the local region, the current date and time, and (ii) autoprogramming the user's inputted local region, current date and time.

16. The non-transitory computer-readable storage medium of claim 14, wherein the first panel displays advertisements when the at least one of texts, images and animations to be displayed are loaded.

17. The non-transitory computer-readable storage medium of claim 14, wherein when the type of Internet network being highlighted in the second panel is the wired network, displaying in the first panel at least an animation illustrating an Ethernet cord being connected to the Ethernet input on the digital device.

18. The non-transitory computer-readable storage medium of claim 14, wherein the displaying in the second panel the list of the plurality of detected inputs to be labeled includes displaying editable text and selectable icons to be associated with each of the plurality of detected inputs to be labeled, respectively.

* * * * *